May 23, 1933.  M. PIER ET AL  1,910,050
METHOD OF PRODUCING VALUABLE LIQUID FUELS
Filed April 8, 1929
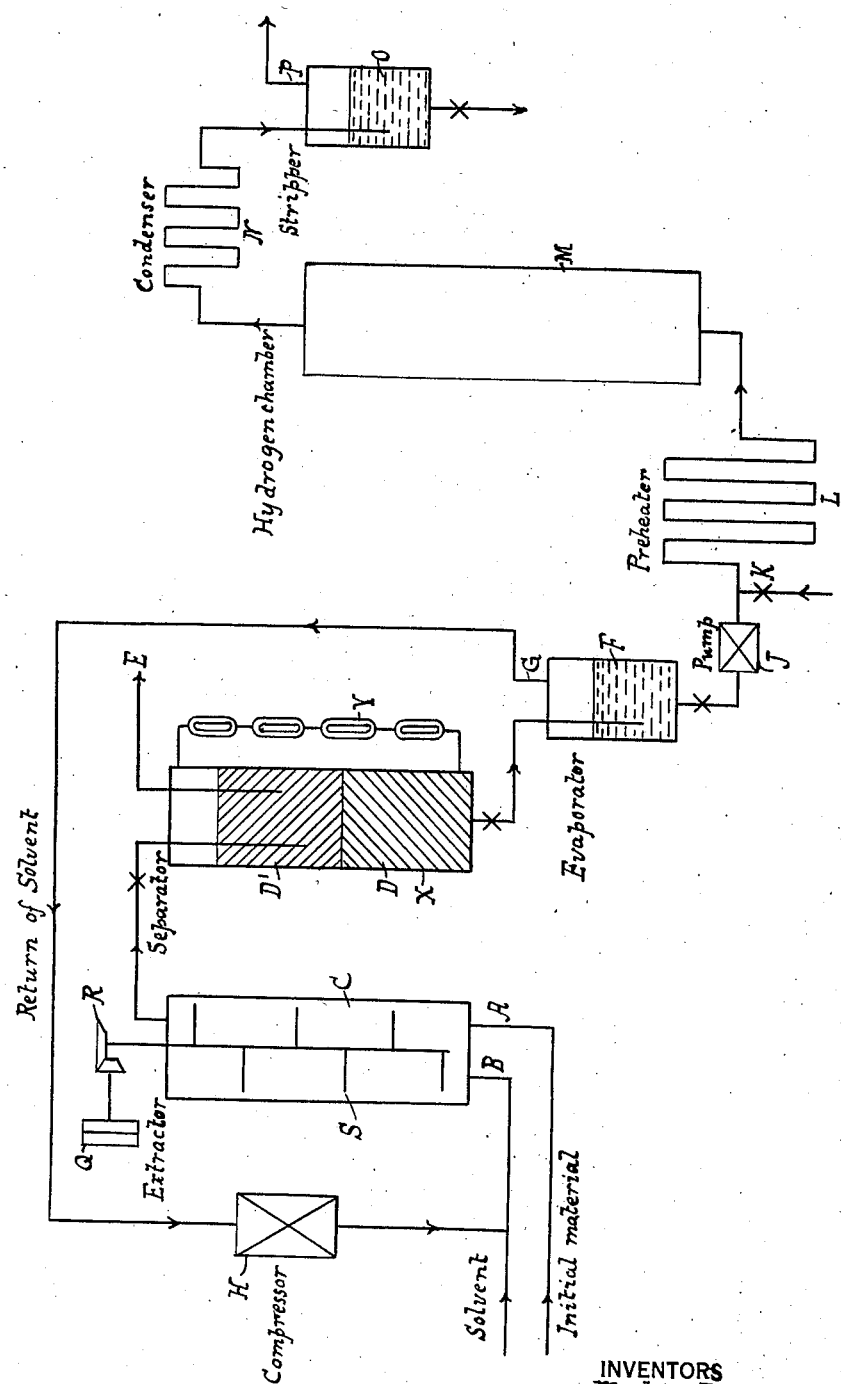
INVENTORS
Mathias Pier
Eugen Anthes
August Eisenhut
By Houff Marland ATTORNEYS Patented May 23, 1933

1,910,050

UNITED STATES PATENT OFFICE

MATHIAS PIER, OF HEIDELBERG, EUGEN ANTHES, OF LUDWIGSHAFEN-ON-THE-RHINE, AND AUGUST EISENHUT, OF WIEBLINGEN, GERMANY, ASSIGNORS, BY MESNE ASSIGNMENTS, TO STANDARD-I. G. COMPANY, OF LINDEN, NEW JERSEY, A CORPORATION OF DELAWARE

METHOD OF PRODUCING VALUABLE LIQUID FUELS

Application filed April 8, 1929, Serial No. 353,688, and in Germany April 26, 1928.

This invention relates to improvements in the manufacture and production of valuable liquid fuels from distillable liquid carbonaceous materials of various kinds.

We have found that valuable liquid fuels can be obtained from liquid hydrocarbon products containing hydrocarbons of different degrees of saturation with hydrogen, such as tars, or mineral oils, or the products obtained by distillation, destructive hydrogenation, or cracking of various kinds of coal, tars or mineral oils, by separating the initial materials into two portions, one of which is richer and one of which is poorer in hydrogen, by treatment with solvents in which the solubility of the said portions is considerably different, the first portion, rich in hydrogen, being partially or wholly suitable for employment as illuminating oil or Diesel oil, either directly or after treatment with hydrogen under pressure and at an elevated temperature, and the second fraction poorer in hydrogen being subjected to a destructive hydrogenation under a pressure of at least 50 atmospheres, either alone or together with other carbonaceous substances, or even with a part of the portion rich in hydrogen thereby obtaining a non-knocking motor fuel of low boiling point.

It is preferable to work in such a manner that the constituents of the nature of middle oils are separated from the initial materials, in so far as the latter are not themselves middle oils, and that these are then separated by treatment with solvents into constituents rich in hydrogen and suitable as illuminating oils and Diesel oils, and constituents poorer in hydrogen, the latter being or remaining dissolved in the solvent, whereas the former forms a layer thereon, which latter are then, as already described, converted into a non-knocking motor fuel by treatment with hydrogen, if desired together with the constituents remaining after the separation of the middle oils.

Liquid sulphur dioxide or liquid ammonia, if desired in admixture with cyclohexane, or methanol or both may be advantageously employed as the solvent. The process may be carried out, for example, by subjecting the middle oils to extraction with liquid sulphur dioxide, whereby the constituents poor in hydrogen, and in particular the aromatic hydrocarbons, are dissolved. The extraction agent, after separation from the extracted constituents for example by distilling off may be employed again.

The process in accordance with the present invention is attended by considerable advantages. The constituents rich in hydrogen, for example, of the products of medium boiling point obtained by the destructive hydrogenation of various kinds of coal, tars, mineral oils and the like, constitute excellent illuminating oils which do not give rise to the formation of carbon deposits and which comply entirely with the standards for such oils. They are also excellently suitable for employment as Diesel oils.

The extracted constituents poor in hydrogen and containing in particular aromatic compounds are subjected to a treatment with hydrogen either alone or together with other carbonaceous substances, for example those which remain after the separation of the middle oils from mineral oils, destructive hydrogenation products or the like, the treatment preferably being under pressure. Non-knocking motor fuels can then readily be obtained in which the ratio of the amounts of aromatic hydrocarbons to those of the other constituents is very satisfactory. Good benzines are also obtained by subjecting the constituents poor in hydrogen to destructive hydrogenation together with other carbonaceous substances, as for example mineral oil residues and the like. The products obtained by the said destructive hydrogenation of the constituents poor in hydrogen may also be mixed with benzines obtained from any source, for example with benzine arising from the destructive hydrogenation of brown coal rich in bitumen.

It is preferable to carry out the destructive hydrogenation or the separate stages thereof in the presence of catalysts, in particular those immune to poisoning by sulphur and in particular those from the sixth group of the periodic system.

The products poor in hydrogen obtained by the extraction may also be employed with advantage for the extraction of valuable products from various kinds of coal, and the like, under pressure, or for the working up of oleiferous residues obtained in the destructive hydrogenation of coal.

An apparatus for carrying out the process according to the present invention is further illustrated in vertical cross-section by way of example in the accompanying drawing, though it should be understood that the invention is not limited to operating in the specific apparatus illustrated. In the drawing $c$ is a mixing device; $a$ is a pipe for the introduction of carbonaceous material into said device; $b$ is a pipe for the introduction of solvent, and $s$ is a stirrer in said mixing device, which is set in motion by the driving wheel $q$ and the bevel gear $r$. $o$ is a separating vessel in which the treated materials separate into two layers; $y$ is a spy-glass; $e$ is a pipe for drawing off the upper layer from the said separating vessel; $f$ is a vessel for the separation of the solvent from the separated product; $g$ is a pipe for the return of the solvent; $h$ is a compressor for reliquefying the solvent; $j$ is a compressor; $k$ is a pipe for the introduction of hydrogen; $l$ is a heating coil; $m$ is a high-pressure reaction vessel; $n$ is a condenser and $o$ is a separating vessel.

In the operation of the process the liquid carbonaceous material to be treated is introduced into the mixing vessel $c$ by way of the pipe $a$ and a solvent in which the solubility of the portion poorer in hydrogen is considerably different from that of the portion richer in hydrogen is introduced into the mixing vessel by way of the pipe $b$. The materials are well mixed by the stirrer $c$, actuated by the driving wheel $q$ and the bevel gear $r$. The mixture is then passed into the separating vessel $o$ fitted with the spy-glass $y$ in which the mixture separates into two layers, the upper layer consisting of the portion rich in hydrogen and the lower layer of the solution of the portion poor in hydrogen in the solvent in cases where the solvent is of such a nature that the portion of the carbonaceous material poor in hydrogen dissolves therein and that the solution obtained is denser than the portion rich in hydrogen. The former is drawn off by way of the pipe $e$. The solution of the portion poor in hydrogen is drawn off into the vessel $f$ in which the solvent is evaporated and returned for use by way of the pipe $g$. The solvent is reliquefied in the compressor $h$ and returned to the process. The portion poor in hydrogen remaining in the vessel $f$ is passed to the compressor $j$, and hydrogen having the same pressure is introduced at $k$. The mixture is preheated to the desired temperature in the coil $l$ and is then passed into the high pressure reaction vessel $n$. The reaction products issuing from the said vessel are cooled in the condenser $n$ and passed into the stripping vessel $o$. The unused hydrogen is removed through the vessel $p$ and may be returned to the process.

The following examples will further illustrate the nature of this invention, but the invention is not restricted thereto.

*Example 1*

By catalytic destructive hydrogenation, with hydrogen under a pressure of about 200 atmospheres and at about 425° C., Columbia middle oil, which contains no useful illuminating oil, yields a product consisting of from 20 to 25 per cent of benzine and of from 70 to 80 per cent of a crude illuminating oil. The crude illuminating oil which is separated off by distillation is then separated by means of liquid sulphur dioxide into about 60 per cent of a pure illuminating oil having excellent illuminating properties and from 20 to 25 per cent of a product poor in hydrogen, and which consists mainly of aromatic hydrocarbons, which latter product dissolves in the sulphur dioxide. The latter product is again added to the initial material (Columbia middle oil) after evaporation of the sulphur dioxide and the two together are then subjected to destructive hydrogenation. The benzines thus obtained are much better as regards their anti-knocking properties than the benzines obtained from the initial material without the said addition. The tendency of the fuel to knock is thus reduced almost by 50 per cent.

*Example 2*

A middle oil obtained by the destructive hydrogenation of brown coal in the presence of a catalyst comprising molybdic acid and zinc oxide is subjected to a further destructive hydrogenation at a temperature of about 450° C. and under a pressure of about 200 atmospheres in the presence of a catalyst comprising a mixture of the oxides of molybdenum, chromium and manganese, a mixture of oil and benzine being thus obtained, which, after separating off the fractions of low boiling point by distillation, is separated into two portions, one of which is richer and one of which is poorer in hydrogen, by treatment with liquid sulphur dioxide. The former portion may be employed as an illuminating oil having the same properties as that obtained according to Example 1 or as the illuminating portions obtained from natural mineral oils. The latter portion consisting of constituents poorer in hydrogen is converted by a further destructive hydrogenation into a gasoline which when employed as a fuel in internal combustion engines shows no tendency to knock.

Example 3

A topped Crane Upton crude oil is subjected to destructive hydrogenation in the liquid phase under a pressure of about 200 atmospheres and at a temperature of about 450° C. with the employment of a colloidal catalyst comprising the oxides of molybdenum and zinc. The product thus obtained yields 20 to 25 per cent of benzene on distillation and 35 to 40 per cent of a middle oil, the remainder consisting of a lubricating oil fraction. The middle oil, which has the specific gravity 0.832 is split up into two portions by treatment with a mixture of methanol and cyclohexane employed in the proportion 4 to 1. A portion richer in hydrogen is thus obtained having the specific gravity 0.820, which may, for example, be employed as an illuminating oil and further a portion poorer in hydrogen which has the specific gravity 0.910 and which on being subjected to a further destructive hydrogenation yields a gasoline which when employed as a fuel in internal combustion engines is proof against knocking.

Example 4

A middle oil having the specific gravity 0.838 at a temperature of 15° C. which has been obtained by the destructive hydrogenation in the liquid phase of an American fuel oil, when treated with a mixture consisting of 90 per cent of liquid ammonia and 10 per cent of methanol yields an oil having the specific gravity 0.831 and an oil poorer in hydrogen having the specific gravity 0.929. The oils thus obtained are worked up and employed in the same manner as the products obtained according to Example 2.

What we claim is:—

1. A process for the production of valuable liquid fuels from liquid hydrocarbon products containing hydrocarbons of different degrees of saturation with hydrogen, and which contain middle oil and constituents of a higher order than middle oil, which comprises separating the constituents of the nature of middle oil from the initial hydrocarbon product, separating said constituents of the nature of middle oil into two portions, one of which is richer and one of which is poorer in hydrogen, by treatment with solvents in which the solubility of the said portions is considerably different, and subjecting the portion poor in hydrogen to a destructive hydrogenation under a pressure of at least 50 atmospheres, thereby producing a non-knocking motor fuel.

2. A process for the production of valuable liquid fuels from a middle oil obtained by destructive hydrogenation of hydrocarbon products and which consists of hydrocarbons of different degrees of saturation with hydrogen, which comprises separating said middle oil into two portions, one of which is poorer and one of which is richer in hydrogen, by treatment with liquid sulphur dioxide and subjecting the portion poor in hydrogen to a further destructive hydrogenation under a pressure of at least 50 atmospheres, thereby producing a non-knocking fuel.

3. A process for the production of valuable liquid fuels from middle oils which comprises separating said middle oils into two fractions, one of which is richer and one poorer in hydrogen, by treatment with a solvent in which the solubility of the said portions is considerably different, and subjecting the portion poor in hydrogen to destructive hydrogenation under a pressure of at least 50 atmospheres to produce a non-knocking motor fuel.

4. A process for the production of valuble liquid fuels from middle oils which comprises separating said middle oils into two portions, one of which is richer and one poorer in hydrogen, by treatment with solvents in which the solubility of the said portions is considerably different and subjecting the portion poorer in hydrogen together with other carbonaceous substances to destructive hydrogenation under a pressure of at least 50 atmospheres to produce a non-knocking motor fuel.

5. A process for the production of valuable liquid fuels from middle oils which comprises separating said middle oils into two portions, one of which is richer and one poorer in hydrogen, by treatment with liquid sulphur dioxide and subjecting the portion poorer in hydrogen to desctructive hydrogenation under a pressure of at least 50 atmospheres to produce a non-knocking motor fuel.

6. A process for the production of valuable liquid fuels from middle oils which comprises separating said middle oils into two portions, one of which is richer and one poorer in hydrogen, by treatment with a mixture of methanol and cyclohexane, and subjecting the portion poorer in hydrogen to destructive hydrogenation under a pressure of at least 50 atmospheres to produce a non-knocking motor fuel.

7. A process for the production of valuable liquid fuels from middle oils which comprises separating said middle oils into two portions, one of which is richer and one poorer in hydrogen, by treatment with a mixture of ammonia and methanol, and subjecting the portion poorer in hydrogen to destructive hydrogenation under a pressure of at least 50 atmospheres to produce a non-knocking motor fuel.

In testimony whereof we have hereunto set our hands.

MATHIAS PIER.
EUGEN ANTHES.
AUGUST EISENHUT.